United States Patent [19]

Makita

[11] Patent Number: 5,856,851
[45] Date of Patent: Jan. 5, 1999

[54] CLOCK PHASE SYNCHRONIZING CIRCUIT

[75] Inventor: Hideo Makita, Tokyo, Japan

[73] Assignee: NEC Corporation, Japan

[21] Appl. No.: 828,704

[22] Filed: Mar. 31, 1997

[51] Int. Cl.[6] .................................................. H04N 5/12
[52] U.S. Cl. ......................................... 348/537; 348/536
[58] Field of Search .................................... 348/537, 536, 348/538, 539, 512, 513, 514, 515; 358/158; H04N 5/12

[56] References Cited

U.S. PATENT DOCUMENTS

| | | | |
|---|---|---|---|
| 4,165,524 | 8/1979 | Ninomiya | 348/513 |
| 4,249,198 | 2/1981 | Ito et al. | 348/514 |
| 4,673,980 | 6/1987 | Murakami et al. | 358/149 |
| 4,688,081 | 8/1987 | Furuhata et al. | 348/506 |
| 5,453,885 | 9/1995 | Takeshita et al. | 348/497 |
| 5,528,307 | 6/1996 | Owada et al. | 348/537 |

FOREIGN PATENT DOCUMENTS

| | | |
|---|---|---|
| 485021 | 5/1992 | European Pat. Off. . |
| 503657 | 9/1992 | European Pat. Off. . |
| 564272 | 10/1993 | European Pat. Off. . |
| 56-054613 | 5/1981 | Japan . |
| 4-150484 | 5/1992 | Japan . |
| 7-038544 | 2/1995 | Japan . |
| 2275852 | 9/1994 | United Kingdom . |

OTHER PUBLICATIONS

Y. Otsuka, et al., "A Study of Bit Synchronization Circuit For High–Speed Switching Systems", SSE89–114, pp. 37–42.

*Primary Examiner*—Chris Grant
*Attorney, Agent, or Firm*—Ostrolenk, Faber, Gerb & Soffen, LLP

[57] ABSTRACT

When the margin between a write frequency-divided clock signal and a read frequency-divided clock signal becomes remarkably decreased, a clock phase difference detecting circuit outputs a reset execution command. While a reset execution command is being output in a blanking interval, a reset signal generating circuit supplies a reset signal to an input side counter corresponding to a reset execution command so as to reset the phase of the write frequency-divided clock signal to an initial state.

8 Claims, 8 Drawing Sheets

PRIOR ART  F I G. 8
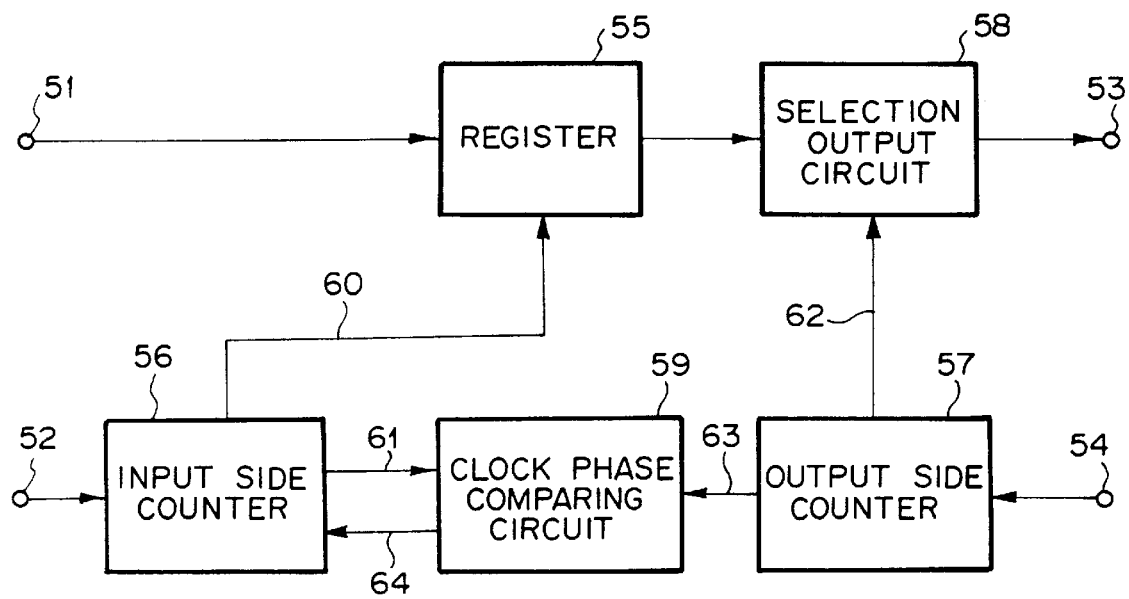

CLOCK PHASE SYNCHRONIZING CIRCUIT

BACKGROUND OF THE INVENTION

1. Field of the Invention

The present invention relates to a phase synchronizing circuit for use with a scanning converter for converting a scanning speed, a data transmission speed converter for exchanging data of a serial digital picture signal of a television signal, and a scanning circuit for securely scanning a picture signal without fluctuation.

2. Description of the Related Art

FIG. 8 is a block diagram showing a phase synchronizing circuit for use with a communication system that can transmit serial data at high speed.

In FIG. 8, the phase synchronizing circuit is composed of a data input terminal 51, an input clock input terminal 52, a data output terminal 53, an output clock input terminal 54, a register 55, an input side counter 56, an output side counter 57, a selection output circuit 58, and a clock phase comparing circuit 59.

A serial data signal is supplied to the data input terminal 51. Next, the serial data signal is supplied to the register 55. The register 55 is composed of a plurality of flip-flop circuits (hereinafter, referred to as F/F) that are connected in parallel. The F/Fs successively store the serial data of the input data. The period of which one F/F updates data depends on the stage number of F/Fs. For example, when the register 55 is composed of 10 stages of F/Fs, the data update period of each F/F becomes ⅒ period. Thus, the input data is chronologically expanded 10 times. The selection output circuit 58 selects one F/F output data from the F/Fs composing the register 55 corresponding to a selection signal 62 received from the output side counter 57 and supplies the data to the data output terminal 53.

A clock signal in synchronization with the input data is supplied to the clock input terminal 52. The input side counter 56 generates frequency-divided clock signals with phases that differ by one clock period and supplies the frequency-divided clock signals as write clock signals to the register 55. In addition, the input side counter 56 supplies a write phase signal 61 to the clock phase comparing circuit 59.

The output side counter 57 generates 10 frequency-divided clock signals with phases that differ by one clock period with an output clock signal received from the output clock input terminal 54 and outputs the frequency-divided clock signals as selection signals to the selection output circuit 58. In addition, the output side counter 57 supplies a phase reference signal 63 to the clock phase comparing circuit 59. The clock phase comparing circuit 59 detects the phase difference between the write phase signal 61 and the phase reference signal 63. When the clock phase comparing circuit 59 cannot detect a predetermined phase difference, it supplies a reset signal 64 to the input side counter 56 so as to change the phases of the write frequency-divided clock signals 60 of the input side counter 56 to the initial state.

When the phase synchronizing circuit is used for a serial digital picture signal (hereinafter, referred to as picture signal), the input side counter 56 is reset while a picture is being displayed. Thus, a noise takes place in the output picture due to the fact that the conventional phase synchronizing circuit is mainly used for high speed communication systems and the phase of the input clock signal does not chronologically vary. Further, it is generally not necessary to reset the unit once the unit is in operation after the initial reset. Even if the reset operation is required, the number of times thereof is small. Thus, such a high speed communication system does not have a function for controlling the timing of the reset operation.

However, in the case where the input signal is a picture signal, the reset operation may be frequently required. For example, it is necessary for a picture signal in a broadcasting station to synchronize with a reference signal called a black burst signal. An operation clock signal is made from the black burst signal. The clock signal is generated by a PLL circuit. However, the phase of the clock signal inevitably fluctuates (this fluctuation is known as jitter) at any time for the principal of the PLL circuit.

In addition, the black burst signal that is the reference signal is an analog signal. Thus, when the black burst signal is supplied to each unit, noise enters the black burst signal and distortion thereof takes place. Consequently, since the jitter takes place, it is estimated that the phase difference between the write clock signal and the read clock signal of the phase synchronizing circuit fluctuates for several clock periods. Thus, when the conventional phase synchronizing circuit is used for a picture signal, the reset operation is frequently performed. When the reset operation is performed while a picture is being displayed, noise takes place in the picture signal.

SUMMARY OF THE INVENTION

An object of the present invention is to provide a clock phase synchronizing circuit for suppressing noise which occurs in a picture due to a reset operation.

The present invention is a clock phase synchronizing circuit comprising a picture signal input terminal for receiving a serial digital picture signal, a picture signal output terminal, an input clock input terminal for receiving an input clock signal in synchronization with data of the picture signal received from the picture signal input terminal, an output clock input terminal for receiving an output clock signal, a timing reference signal input terminal for receiving a black burst signal, a register composed of N flip-flops that are connected in parallel (where N is two or more), for temporarily storing data supplied from the picture signal input terminal, an input side counter for receiving the input clock signal from the input clock input terminal and for generating N write frequency-divided clock signals with phases that differ by one clock period and supplying the write frequency-divided clock signals to the relevant flip-flops as write clock signals, an output side counter for receiving an output clock signal from the output clock input terminal and for generating N read frequency-divided clock signals with phases that differ by one clock period and outputting the N read frequency-divided clock signals as selection signals, a selection output circuit for receiving the selection signals and for selecting one of the output signals of the flip-flops corresponding to the selection signals, and outputting the selected output signal to the picture signal output terminal, a clock phase difference detecting circuit for detecting the phase difference of a read frequency-divided clock signal and a relevant write frequency-divided clock signal corresponding to a relevant flip-flop and outputting a reset execution command when the phase difference is a predetermined value or less, a reset timing signal generating circuit for detecting a blanking interval with the black burst signal received from the timing reference signal input terminal and outputting a reset timing signal in the blanking interval, and a reset signal generating circuit for outputting a reset signal to the input side counter and forcedly resetting the phases of the write frequency-divided clock signals to an initial state when the reset execution command is output while the reset timing signal is being output.

According to the present invention, a blanking interval (non-display interval) of a video signal is detected from a black burst signal that is a timing reference used in a broadcasting station. In this blanking interval, a reset operation is performed. Thus, when the phase difference between a write clock signal and a read clock signal becomes sufficiently large such that a reset operation is required, the reset operation can be performed without influence on the display picture.

In addition, when the phase difference of the write clock signal and the read clock signal is detected in multiple stages, the execution frequency of the reset operation can be varied corresponding to the stability of the clock signal of the system.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 8 is a block diagram showing the structure of a conventional phase synchronizing circuit.

DESCRIPTION OF PREFERRED EMBODIMENT

An embodiment of the present invention will be described with reference to the accompanying drawings.

Figure 1:
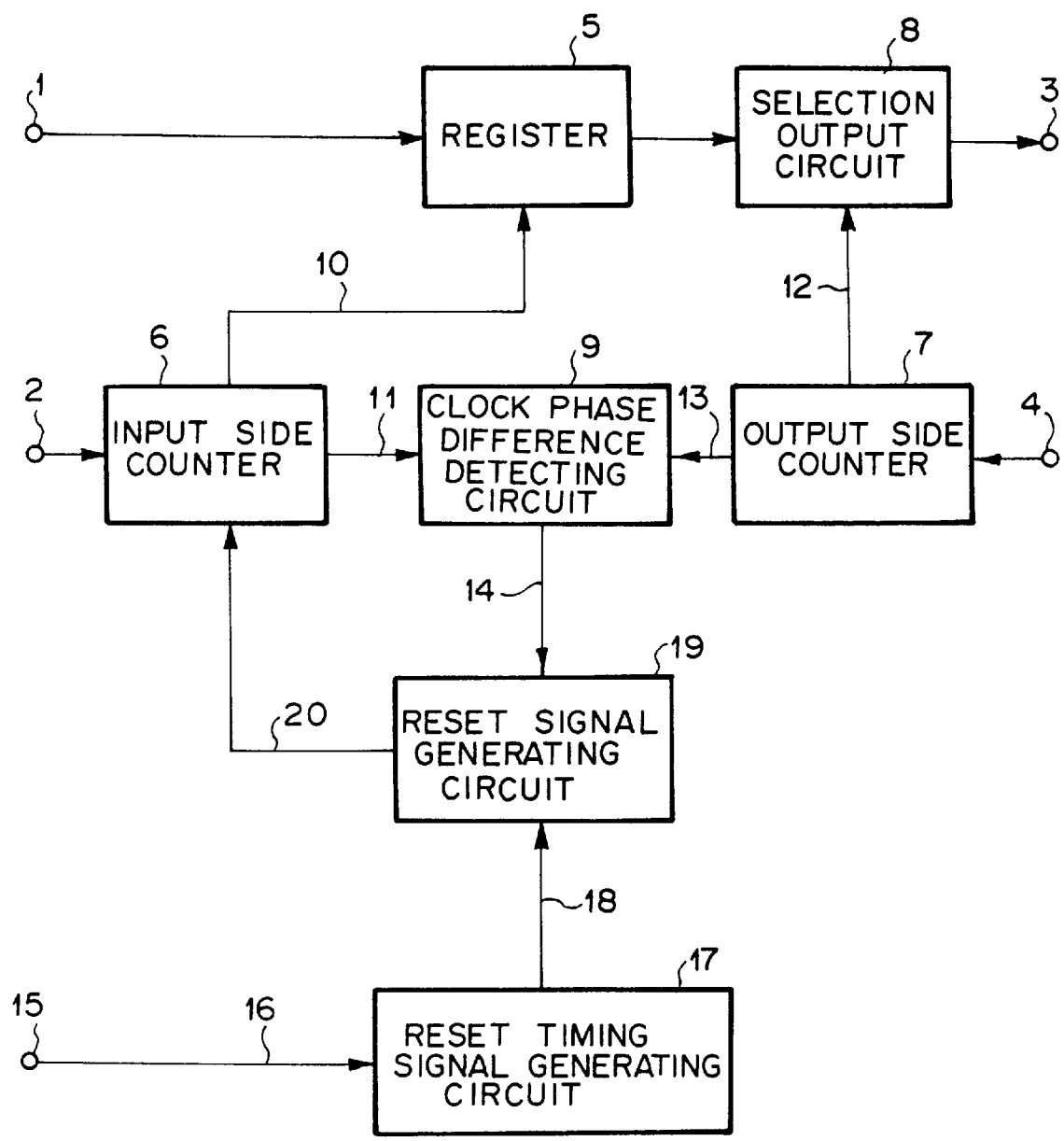
FIG. 1 is a block diagram showing the structure of a clock phase synchronizing circuit according to an embodiment of the present invention.

FIG. 1 is a block diagram showing the structure of a clock phase synchronizing circuit according to an embodiment of the present invention.

The clock phase synchronizing circuit according to the embodiment comprises a picture signal input terminal 1, an input clock input terminal 2, a picture signal output terminal 3, an output clock input terminal 4, a register 5, an input side counter 6, an output side counter 7, a selection output circuit 8, a clock phase difference detecting circuit 9, a timing reference signal input terminal 15, a reset timing signal generating circuit 17, and a reset signal generating circuit 19.

A serial digital picture signal is supplied to the picture signal input terminal 1. A clock signal (an input clock signal) that synchronizes with the serial digital picture signal is supplied to the input clock input terminal 2.

Figure 2:
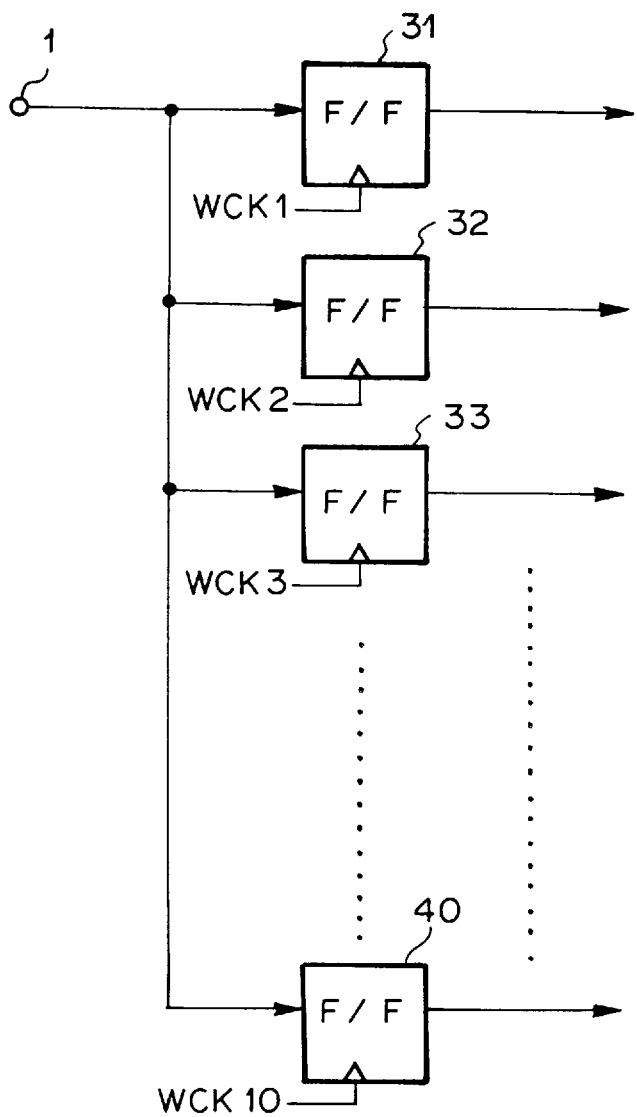
FIG. 2 is a schematic diagram showing the structure of a register used in the clock phase synchronizing circuit shown in FIG. 1.

As shown in FIG. 2, the register 5 is composed of 10 flip-flops F/F 31, F/F 32, . . . , F/F 40 that are connected in parallel. The input data received from the picture signal input terminal 1 that is written to the 10 flip-flops F/F 31, F/F 32, F/F 33, . . . , F/F 40 corresponding to 10 frequency-divided clock signals WCK1, WCK2, WCK3, . . . , WCK10 with phases differ by one clock period. The 10 frequency-divided clock signals WCK1, WCK2, WCK3, . . . , WCK10 are received from the input side counter 6. The input side counter 6 divides the frequency of the input clock signal by 10 and generates such 10 frequency-divided clock signals WCK1, WCK2, WCK3, . . . , WCK10. These write clock signals 10 are supplied to the register 5. In addition, the input side counter 6 generates a write clock phase signal 11 to the clock phase difference detecting circuit 9.

Figure 3:
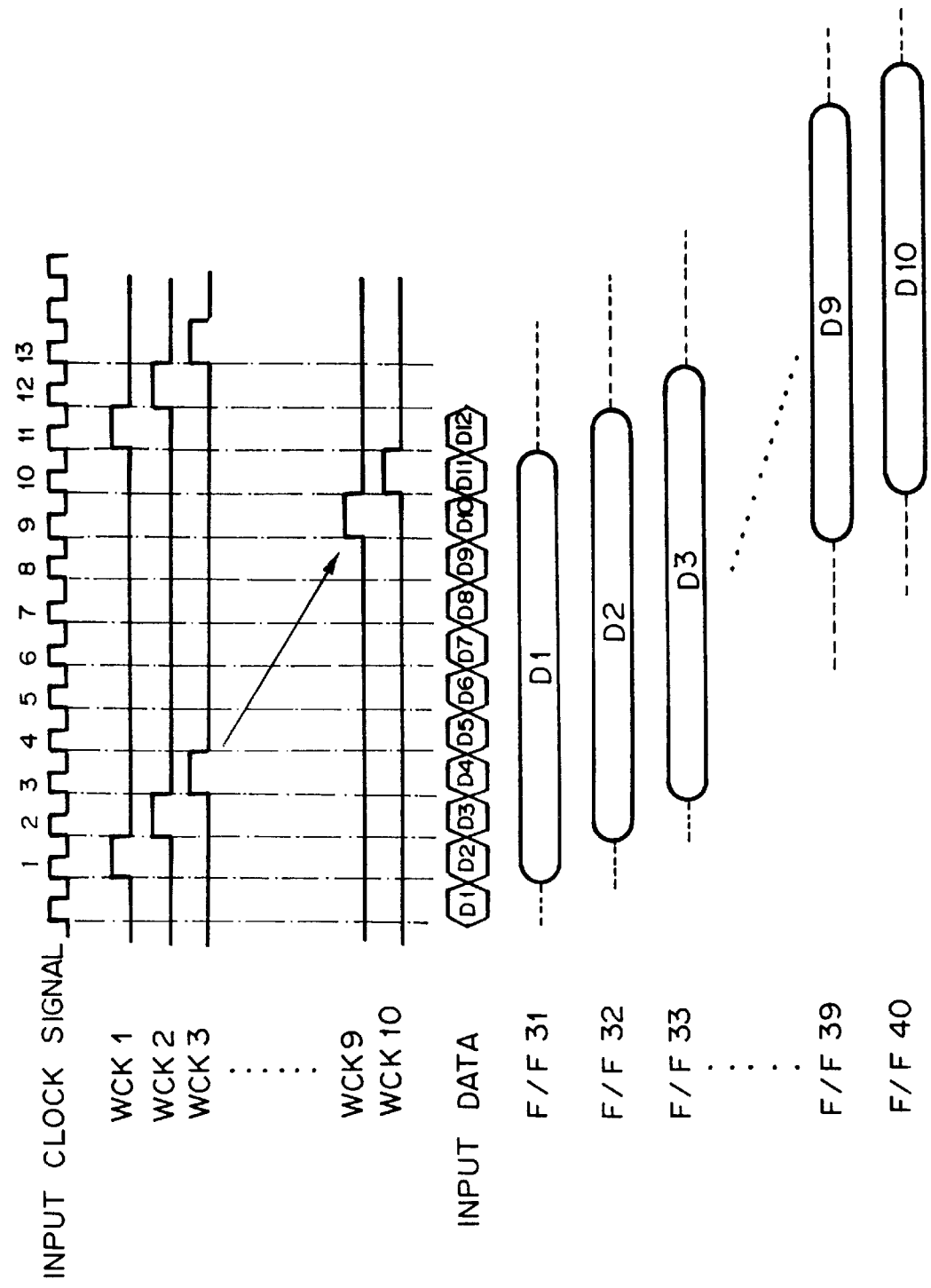
FIG. 3 is a timing chart showing the operation of the register shown in FIG. 2.

FIG. 3 shows the state that when data D1, D2, . . . , D10 are successively supplied to the picture signal input terminal 1, these data D1, D2, . . . , D10 are stored in the flip-flops F/F 31, F/F 32, . . . , F/F 40 corresponding to the 10 frequency-divided write clock signals WCK1, WCK2, . . . , WCK10, respectively. FIG. 3 shows that the data D1, D2, . . . , D10 are expanded by 10 times on time axis and then stored in the flip-flops F/F 31, F/F 32, . . . , F/F 40, respectively.

Figure 6:
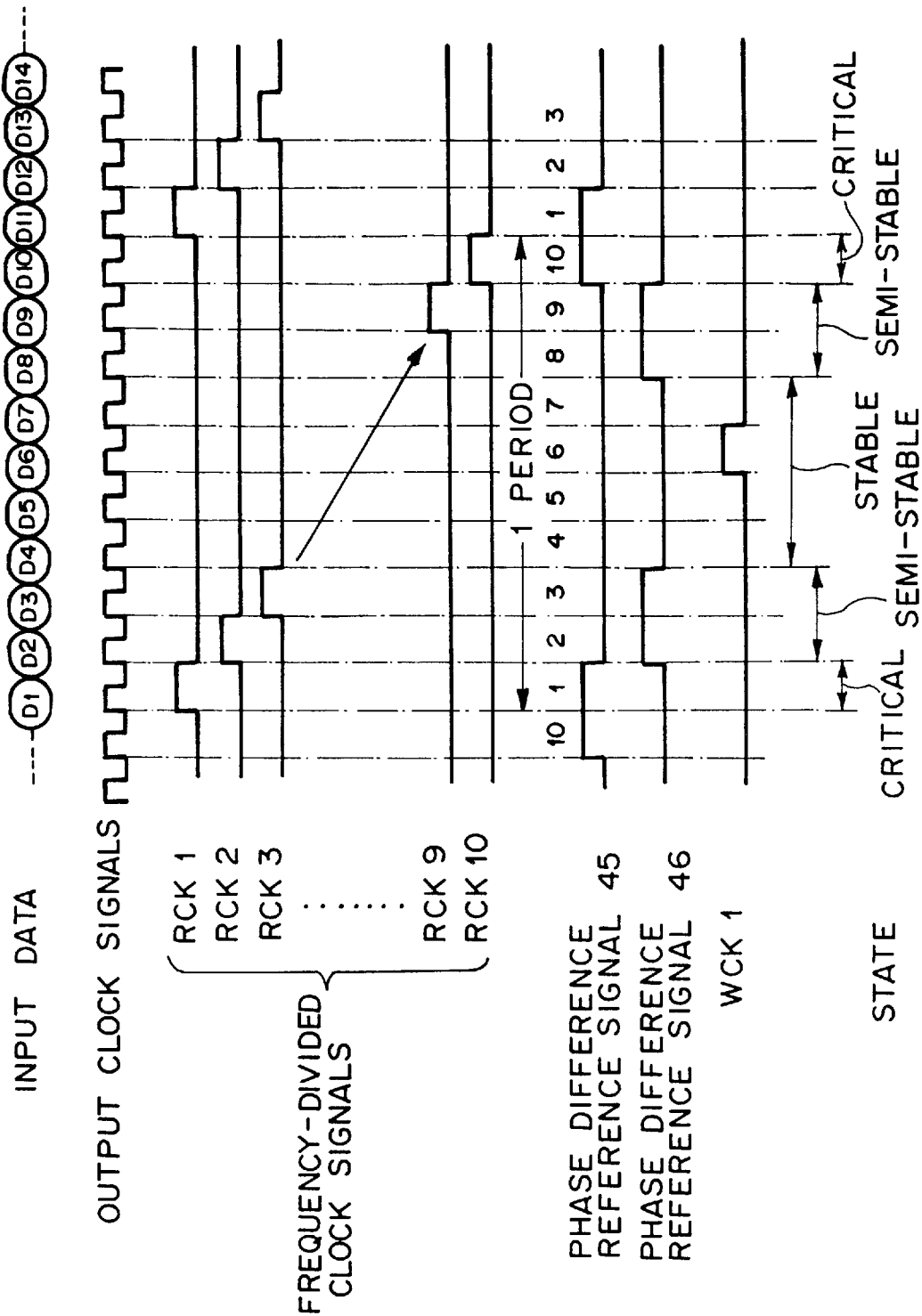
FIG. 6 is a timing chart showing the operation of a clock phase difference detecting circuit shown in FIG. 1.

On the other hand, as shown in FIG. 6, the output side counter 7 divides an output clock signal received from the output clock input terminal 4 by 10 and generates 10 frequency-divided read clock signals RCK1, RCK2, . . . , RCK10 for selecting output data of the F/F 31, F/F 32, . . . , F/F 40. The read clock signals RCK1, RCK2, . . . , RCK10 are output as selection signals 12 to the selection output circuit 8. In addition, the output side counter 7 generates read clock signals RCK1 to RCK3 and RCK8 to RCK10 as phase difference reference signals 13 to the clock phase difference detecting circuit 9.

The selection output circuit 8 selects one of the output signals of flip-flops F/F 31, F/F 32, . . . , F/F 40 in register 5 corresponding to the selection signals 12 and supplies the selected output signal to the picture signal output terminal 3.

When data that have been expanded 10 times and stored in the register 5 are successively selected in such a manner that there is a proper phase difference between the data read side and the data write side, the phase difference margins between the write clock signals and the read clock signals can increase. Next, the increase of the phase difference margins will be described with reference to data stored in the F/F 31.

Figure 4:
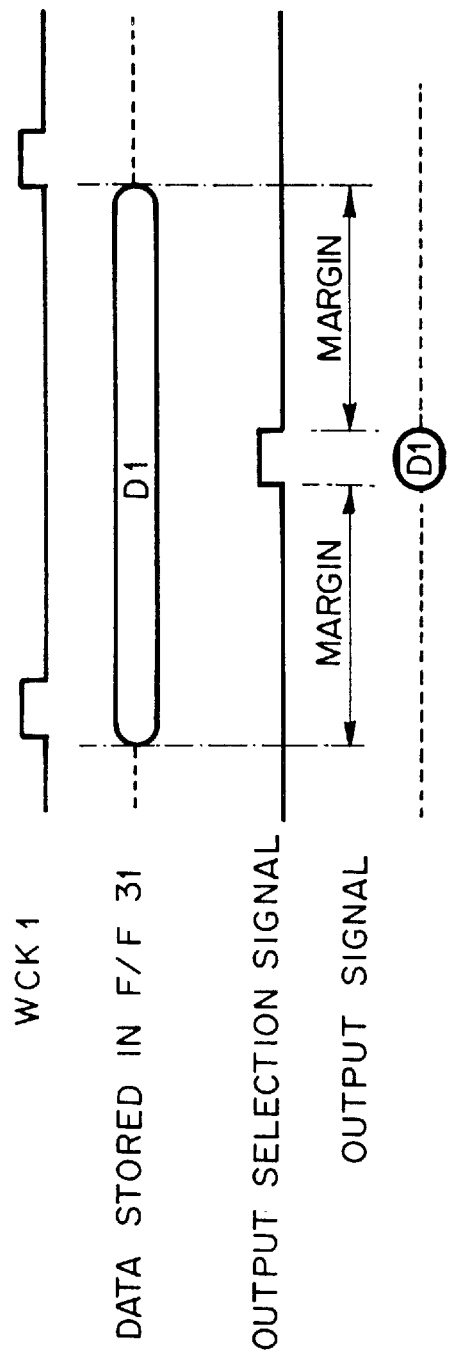
FIG. 4 is a timing chart showing the operation of a selection output circuit shown in FIG. 1.

In FIG. 4, the data D1 stored in the F/F 31 corresponding to one period of the write frequency-divided clock signal WCK1 is stably held up to the next update timing. In this case, since the phases of the write side clock signals and the read side clock signals vary, data is selected at the center of the data hold period and output so as to prevent the phases from fluctuating. In other words, when the write timing to each F/F deviates from the selection output timing by ½ period, the phase difference margin of the clock signal becomes the maximum margin. Thus, in this case, the phase deviation of up to five clock periods of the front and rear in the 10 frequency-divided clock signals can be absorbed.

Figure 5:
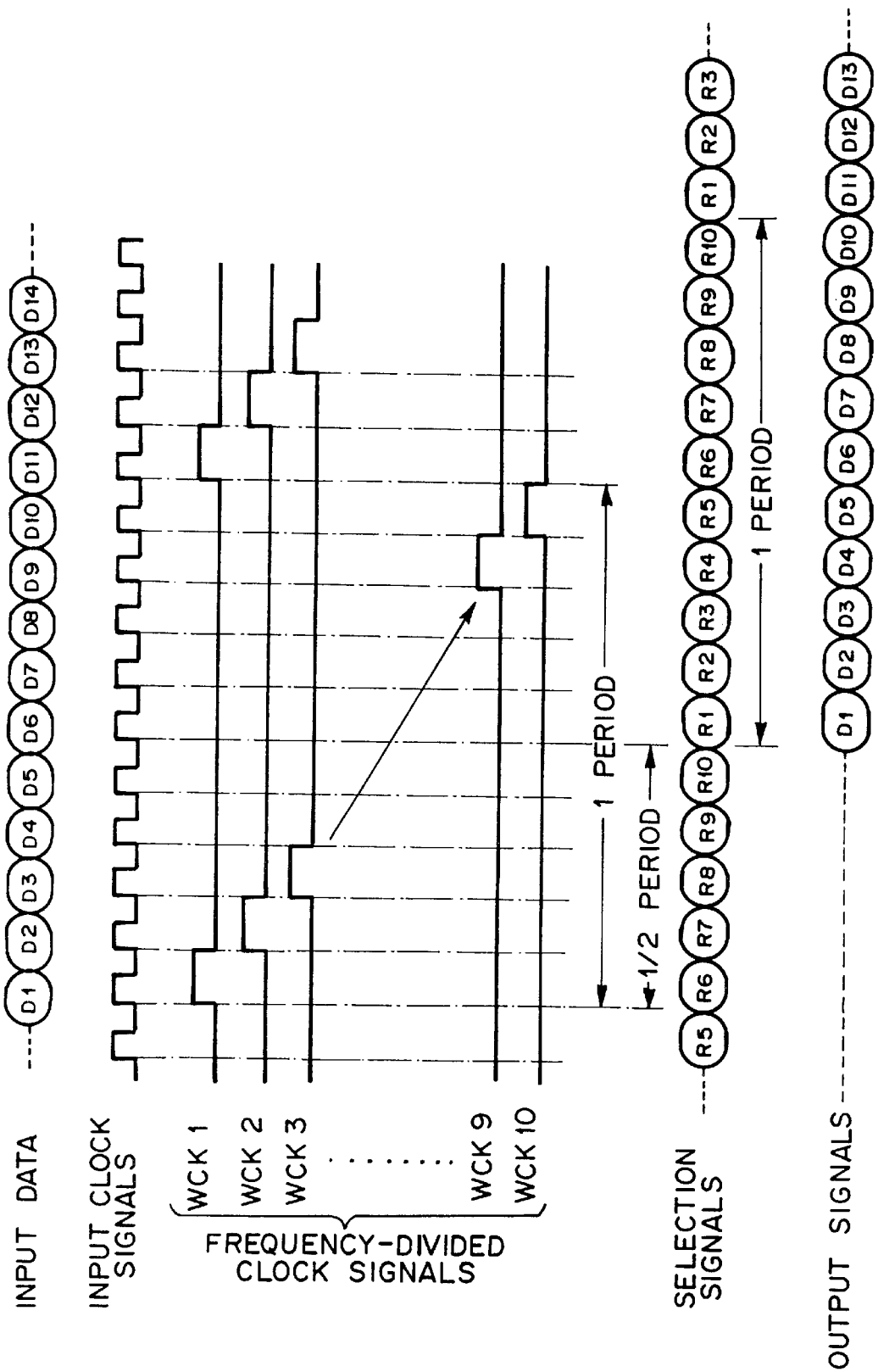
FIG. 5 is a schematic diagram for explaining the phases of input data and output data in the state that a maximum margin is obtained.

FIG. 5 shows read divided-frequencies R1, R2, . . . (read output frequency-divided clock signals RCK1, RCK2, . . .), frequency-divided clock signals WCK1, WCK2, . . . , selection signals R1, R2, . . . , and output signals D1, D2, . . . . As shown in FIG. 4, the write clock signals WCK1, WCK2, . . . , WCK10 deviate from the read clock signals RCK1, RCK2, . . . , RCK10 by ½ period each. Thus, as shown in FIG. 5, the F/F selection signals preferably deviate from the respective write phases by ½ period.

When the phases of the write frequency-divided clock signals WCK1, WCK2, ..., WCK10 and the read frequency-divided clock signals RCK1, RCK2, ..., RCK10 are fixed, the maximum margin can be obtained. However, in reality, the phases of the write frequency-divided clock signals WCK1, WCK2, ..., WCK10 and the read frequency-divided clock signals RCK1, RCK2, ..., RCK10 tend to fluctuate to some extent (namely, they contain jitter components). Thus, the write phases and the read phases ideally deviate by the center of ½ period in one period.

As described above, since the register 5 has a plurality of F/Fs, the phase differences between the write frequency-divided clock signals WCK1, WCK2, ..., WCK10 and the read frequency-divided clock signals RCK1, RCK2, ..., RCK10 are absorbed so that data is correctly exchanged. The amount of fluctuation absorbed depends on the number of stages N of the F/Fs. Assuming that the number of stages of the F/Fs is denoted by N, the value N is designated so that the phase differences of predicted clock signals can be satisfactorily covered. However, occasionally, a phase difference out of the valid range may take place.

In this case, the relation between the write phases and the read phases should be reset so as to restore the relation of the deviation of ½ period as the maximum margin. To do that, the clock phase difference detecting circuit 9 and the reset signal generating circuit 19 are disposed. The clock phase difference detecting circuit 9 monitors the relation between the write phases and the read phases. The reset signal generating circuit 19 executes the reset operation of the apparatus.

Next, with reference to FIG. 6, the operation of the clock phase difference detecting circuit 9 will be described. The phase differences are obtained by detecting the phases of the write frequency-divided clocks WCK1, WCK2, ..., WCK10 corresponding to the phases of the read frequency-divided clocks RCK1, RCK2, ..., RCK10. As with the write side, the read side operates with 10 read frequency-divided clock signals RCK1, RCK2, ..., RCK10 having phases that differ by one clock period. Phase difference detection pulses are generated with the read frequency-divided clock signals RCK1, RCK2, ..., RCK10.

In this embodiment, the maximum margin of the phase difference is obtained when the phase difference between the write phase and the read phase is ½ period. This state is referred to as stable state. The state of which the difference between the write phase and the read phase is several clock periods is referred to as semi-stable state. The state of which adjacent margins is one clock period or less is referred to as critical state. However, according to the present invention, these definitions are not restricted. To detect these states, two types of phase reference pulses are generated and values are stored with 10 write frequency-divided clock signals.

Figure 7:
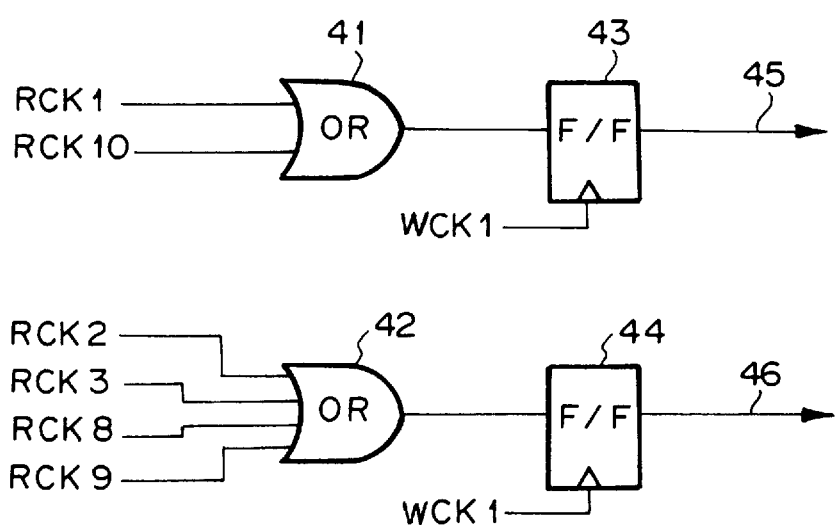
FIG. 7 is a schematic diagram showing the structure of the clock phase difference detecting circuit.

For example, as shown in FIG. 7, the read frequency-divided clock signals RCK1 and RCK10 are ORed by an OR gate 41 and thereby a first phase difference reference signal 45 is generated. The first phase difference reference signal 45 is stored to the F/F 43 corresponding to the write frequency-divided clock signal WCK1. The read frequency divided clock signals RCK2, RCK3, RCK8, and RCK9 are ORed with an OR gate 42 and thereby a second phase difference signal 46 is generated. The second phase difference signal 46 is stored to the F/F 44 corresponding to the write frequency-divided clock signal WCK1. The clock phase difference detecting circuit 9 detects the phase difference states corresponding to the first phase difference reference signal 45 and the second phase difference reference signal 46 as shown in Table 1 and determines the necessity of the execution of the reset operation.

TABLE 1

| First phase difference reference signal 45 | Second phase difference reference signal 46 | Phase difference state |
|---|---|---|
| LOW | LOW | Stable |
| LOW | HIGH | Semi-stable |
| HIGH | LOW | Critical |

When both the levels of the first phase difference reference signal 45 and the second phase difference reference signal 46 are low, since the system is in the stable state, it is not necessary to execute the reset operation.

When the level of the first phase difference reference signal 45 is low and the level of the second phase difference reference signal 46 is high, since the system is in the semi-stable state, it is also not necessary to execute the reset operation. However, in the semi-stable state, depending on the state of the system, the reset operation may be performed.

When the first phase difference reference signal 45 is high and the second phase difference reference signal 46 is low, since the system is in the critical state, there is no phase difference margin. Thus, in this state, the reset operation is required. At this point, a reset execution command 14 is supplied to a reset signal generating circuit 19. According to the embodiment of the present invention, although the phase difference states are categorized as three states, it is possible to categorize the phase difference states as any levels.

The reset timing signal generating circuit 17 detects a blanking interval (screen non-display region) from an input burst signal 16 through the timing reference signal terminal 15 and outputs a reset timing signal 18 in the blanking interval.

When the clock phase difference detecting circuit 9 outputs the reset execution command 14, the reset signal generating circuit 19 outputs a reset signal 20 to the input side counter 6. The reset timing signal generating circuit 17 outputs a reset timing signal 18. Thus, when the phase difference margin between the write side and the read side of the input side counter 6 decreases and the system enters the critical state, the phase of the write side is forcedly reset to the initial state (with a phase that differs by ½ period against the read side). In addition, when the reset operation is executed, noise of the exchange switching and the like can be prevented from entering a picture signal.

As described above, according to the present invention, since the reset operation is performed in the blanking interval, noise according to the reset execution can be prevented from entering a picture signal.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A clock phase synchronizing circuit, comprising:

a picture signal input terminal for receiving a serial digital picture signal;

a picture signal output terminal;

an input clock input terminal for receiving an input clock signal in synchronization with data of the picture signal received by said picture signal input terminal;

an output clock input terminal for receiving an output clock signal;

a timing reference signal input terminal for receiving a black burst signal of the picture signal;

a register composed of N flip-flops connected in parallel, wherein N is an integer greater than one, for temporarily storing data supplied from said picture signal input terminal and outputting the data as output signals;

an input side counter for receiving the input clock signal from said input clock input terminal, generating N write frequency-divided clock signals with phases that differ by one clock period, and supplying the write frequency-divided clock signals to the relevant flip-flops as write clock signals;

an output side counter for receiving an output clock signal from said output clock input terminal, generating N read frequency-divided clock signals with phases that differ by one clock period, and outputting the N read frequency-divided clock signals as selection signals;

a selection output circuit for receiving the selection signals, selecting one of the output signals of the flip-flops corresponding to the selection signals, and outputting the selected output signal to said picture signal output terminal;

a clock phase difference detecting circuit for detecting the phase difference of a read frequency-divided clock signal and a relevant write frequency-divided clock signal corresponding to a selected flip-flop and outputting a reset execution command when the phase difference is no greater than a predetermined value;

a reset timing signal generating circuit for detecting a blanking interval from the black burst signal received from said timing reference signal input terminal and outputting a reset timing signal in the blanking interval; and a reset signal generating circuit for receiving the reset timing signal and outputting a reset signal to said input side counter such that said input side counter forcedly resets the phases of the write frequency-divided clock signals to an initial state in accordance with the reset timing signal when the reset execution command is output.

2. The clock phase synchronizing circuit as set forth in claim 1,
wherein said clock phase difference detecting circuit categorizes each phase difference between the write frequency-divided clock signals and the read frequency-divided clock signals as being one of a plurality of levels.

3. The clock phase synchronizing circuit as set forth in claim 1,
wherein said clock phase difference detecting circuit comprises:
an OR circuit for ORing a minimum of the N read frequency-divided clock signal and a maximum of the N read frequency-divided clock signal; and
a flip-flop for latching an output signal of said OR circuit, wherein the flip-flop outputs the reset execution command according to a first clock signal of the write N frequency-divided clock signals.

4. The clock phase synchronizing circuit as set forth in claim 1,
wherein said clock phase difference detecting circuit comprises:
an OR circuit for ORing one and two signals after a minimum of the N read frequency-divided clock signals and one and two signals before a maximum of the N read frequency-divided clock signals; and
a flip-flop for latching an output signal of said OR circuit, wherein the flip-flop outputs the reset execution command according to a first clock signal of the N write frequency-divided clock signals.

5. The clock phase synchronizing circuit as set forth in claim 2,
wherein said clock phase difference detecting circuit comprises:
a first through $N^{th}$ OR circuits for ORing first through $N^{th}$ pluralities of read clock signals having a least minimum through $N^{th}$ phase differences, respectively, with a predetermined write frequency-divided clock signal;
first through $N^{th}$ flip-flops for latching output signals of the first through $N^{th}$ OR circuits, respectively; and
a clock phase difference determining circuit for determining the phase differences between the write frequency-divided clock signals and the read frequency-divided clock signals corresponding to the output signals of the first through $N^{th}$ flip-flops, respectively.

6. The clock phase synchronizing circuit as set forth in claim 2,
wherein said clock phase difference detecting circuit comprises:
an OR circuit for ORing a minimum of the N read frequency-divided clock signal and a maximum of the N read frequency-divided clock signal; and
a flip-flop for latching an output signal of said OR circuit, wherein the flip-flop outputs the reset execution command according to a first clock signal of the N write frequency-divided clock signals.

7. The clock phase synchronizing circuit as set forth in claim 2,
wherein said clock phase difference detecting circuit comprises:
an OR circuit for ORing one and two signals after a minimum of the N read frequency-divided clock signals and one and two signals before a maximum of the N read frequency-divided clock signals; and
a flip-flop for latching an output signal of said OR circuit, wherein the flip-flop outputs the reset execution command according to a first clock signal of the N write frequency-divided clock signals.

8. A clock synchronizing circuit, comprising:
storing means for temporarily storing data from a picture signal;
an input side counting means for receiving an input clock signal, generating N write frequency-divided clock signals, and supplying the write frequency-divided clock signals to the storing means as data signals, wherein N is an integer greater than one;
an output side counting means for receiving an output clock signal, generating N read frequency-divided clock signals, and outputting the N read frequency-divided clock signals as selection signals;
selecting means for receiving the selection signals and selecting stored data signals in accordance therewith and outputting the selected data signals as output picture signals;

clock phase difference detecting means for detecting the phase difference between a read frequency-divided clock signal and a corresponding write frequency-divided clock signal and for outputting a reset command when the detected phase difference is no greater than a predetermined value;

reset timing means for receiving a black burst signal, detecting a blanking interval from the black burst signal of the picture signal, and upon detection thereof, for generating a reset timing signal in the blanking interval; and resetting means for forcing the input side counting means to reset the phases of the write frequency-divided clock signals to an initial state in accordance with the reset timing signal when the reset command is output from the clock phase difference detecting means.

* * * * *